United States Patent
Suzuki et al.

(10) Patent No.: US 7,936,958 B2
(45) Date of Patent: May 3, 2011

(54) PRODUCTION METHOD FOR OPTICAL FIBER COIL

(75) Inventors: Masayoshi Suzuki, Shizuoka (JP);
Tadao Matsunaga, Shizuoka (JP);
Tomoki Furue, Shizuoka (JP); Ken Sukegawa, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 0 days.

(21) Appl. No.: 12/723,745

(22) Filed: Mar. 15, 2010

(65) Prior Publication Data
US 2010/0170076 A1    Jul. 8, 2010

Related U.S. Application Data

(62) Division of application No. 11/896,224, filed on Aug. 30, 2007, now abandoned.

(30) Foreign Application Priority Data

Aug. 30, 2006  (JP) .................................. 2006-233096

(51) Int. Cl.
*G02B 6/44*    (2006.01)
(52) U.S. Cl. ........................................ 385/114; 385/102

(58) Field of Classification Search ........................ None
See application file for complete search history.

(56) References Cited

U.S. PATENT DOCUMENTS

| | | | |
|---|---|---|---|
| 4,115,175 A * | 9/1978 | Yamashita et al. ............ | 156/172 |
| 5,457,762 A | 10/1995 | Lochkovic et al. | |
| 5,848,213 A * | 12/1998 | Rahn ............................. | 385/115 |
| 6,028,976 A | 2/2000 | Sato et al. | |
| 6,600,859 B2 | 7/2003 | Chandraiah et al. | |
| 7,376,313 B2 * | 5/2008 | Sansone et al. ................ | 385/104 |
| 2003/0026562 A1 | 2/2003 | Takahashi | |
| 2004/0028372 A1 * | 2/2004 | Nagayama et al. ........... | 385/147 |
| 2005/0169588 A1 * | 8/2005 | Sutehall et al. ................ | 385/109 |
| 2005/0185904 A1 | 8/2005 | Johnson et al. | |
| 2008/0101753 A1 * | 5/2008 | Suzuki et al. ................. | 385/114 |

FOREIGN PATENT DOCUMENTS

JP    2003-107250 A    4/2003

* cited by examiner

*Primary Examiner* — Tina M Wong
(74) *Attorney, Agent, or Firm* — Arent Fox LLP

(57) ABSTRACT

An optical fiber coil and a production method therefor reduce the likelihood of optical transmission loss due to stress or temperature changes at low cost. Plural single optical fibers are arranged in parallel and are integrally covered with a covering portion so as to form an optical fiber ribbon, and the optical fiber ribbon is wound into a coiled state.

2 Claims, 8 Drawing Sheets

PRODUCTION METHOD FOR OPTICAL FIBER COIL

CROSS-REFERENCE TO RELATED APPLICATION

This application is a Divisional Application of U.S. patent application Ser. No. 11/896,224, filed Aug. 30, 2007, now pending, which claims the benefit of priority of Japanese Patent Application No. 2006-233096 filed Aug. 30, 2006. The disclosures of the prior applications are hereby incorporated by reference herein in their entirety.

BACKGROUND OF THE INVENTION

1. Field of the Invention

The present invention relates to an optical fiber coil which can be used in a fiber-optic gyroscope, sensor, optical amplifier, laser, dispersion compensator, nonlinear optical device, delay circuit, dummy circuit, other parts employing long optical fibers, extra long handling tool, etc., and which can be used to conserve space and have low tension, and the present invention also relates to a production method for the optical fiber coil.

2. Description of Related Art

Optical fiber type devices that employ optical fibers therein are widely employed in, for example, sensors. In addition, such optical fiber type devices have attracted attention for use in optical fiber amplifiers that are doped with erbium, thulium, praseodymium, etc., dispersion compensators using dispersion-compensated fibers, and nonlinear optical devices.

It is known that optical fiber type devices are superior devices, that connectivity thereof with transmission paths or to other devices is superior, that they are less likely to be affected by external noise, and that they have stable characteristics, because they are constituted of optical fiber.

However, they are disadvantageous in that the optical fiber is bulky when the desired length thereof is long. In order to avoid this problem, an optical fiber coil which is wound around a small bobbin, etc., can be used.

As a general production method for the optical fiber coil, initially, in a first process, an adhesive is applied to a part or the entirety of the surface of one long single optical fiber to form an adhesive layer. The adhesive layer is provided on at least part of the surface of the single optical fiber, so that proximate optical fibers are adhered and fixed to each other when the single optical fiber is wound in a coiled state.

In a subsequent process, the single optical fiber provided with the adhesive layer is wound in a coiled state around a bobbin having a desired diameter by using a coil winding device. At this time, in order to make the coil as compact as possible by minimizing spaces between the single optical fibers, the single optical fiber is wound under conditions in which stress is applied thereto.

The adhesive layer is then dried or cured using a suitable method, and an optical fiber coil having the desired winding diameter, winding width, and winding length, can be produced (see Japanese Unexamined Patent Application Publication No. 2003-107250).

FIG. 8 shows a sectional view of a conventional optical fiber coil. Reference numeral 1 indicates single optical fibers, reference numeral 5 indicates a bobbin, reference numeral 100 indicates a conventional optical fiber coil, and reference letter H indicates a central hole.

As shown in FIG. 8, the conventional optical fiber coil 100 is formed by simply winding the single optical fiber 1 on the bobbin 5.

However, there are problems in the above conventional production method for an optical fiber coil.

That is, since the single optical fibers are exposed to the surface of the fiber coil, optical transmission loss easily occurs due to slight stress or temperature change. As a result, in the case in which the single optical fiber is accurately wound in a coiled state in order to avoid the above loss, it is expensive because of the need for adjustment thereof, or the like.

In addition, when the winding density of the coil is too high, stress is applied to the single optical fibers and optical transmission loss occurs.

SUMMARY OF THE INVENTION

The present invention was completed in consideration of the above problems, and objects thereof are to provide an optical fiber coil and a production method therefor, in which it is difficult for the optical transmission loss due to stress or temperature change to occur, and in which the cost is low.

The present invention solves the above problems by the following technical constructions.

(1) An optical fiber coil of the present invention has an optical fiber ribbon formed by arranging in parallel plural single optical fibers and integrally covering the single optical fibers with a covering portion, and the optical fiber ribbon is wound in a coiled state.

(2) An optical fiber coil of the present invention according to the above optical fiber coil (1) has the optical fiber ribbon covered at the portion other than ends of the ribbon with a covering portion.

(3) An optical fiber coil according to the above optical fiber coil (2) has the covering portion made of silicone rubber.

(4) An optical fiber coil according to the above optical fiber coil (2) has the covering portion made of at least of flame resistant silicone rubber and chloroprene rubber.

(5) A production method for an optical fiber coil of the present invention includes arranging in parallel plural single optical fibers, integrally covering the single optical fibers with a covering portion to form an optical fiber ribbon, and winding the optical fiber ribbon into a coiled state.

(6) A production method for an optical fiber coil of the present invention includes arranging in parallel plural single optical fibers, integrally covering the single optical fibers with a covering portion to form an optical fiber ribbon, winding the optical fiber ribbon into a coiled state to form an optical fiber coil, and forming a covering portion that covers the optical fiber coil at a portion other than at ends of the ribbon.

According to the present invention, an optical fiber coil and a production method therefor can be provided in which it is difficult for the optical transmission loss due to stress or temperature change to occur, and in which the cost is low.

That is, by using an optical fiber ribbon in which plural single optical fibers are arranged in parallel in advance and disposing a covering portion integrally covering them thereon, the single optical fibers can be prevented from being exposed and the optical transmission loss due to stress or temperature change can be decreased. In addition, the adhesive used can also be minimized or be omitted, so that a process for applying the adhesive is minimized. Therefore,

DESCRIPTION OF THE PREFERRED EMBODIMENTS

In order to solve the above-described problems, the present inventors found that an optical fiber coil could be easily produced using an optical fiber ribbon in which many single optical fibers were arranged in parallel and were integrally covered by a covering portion thereon so as to be in the form of a tape, and the present invention was thereby completed.

Embodiment 1 of the present invention will be explained with reference to FIGS. 1 and 2.

Figure 1:
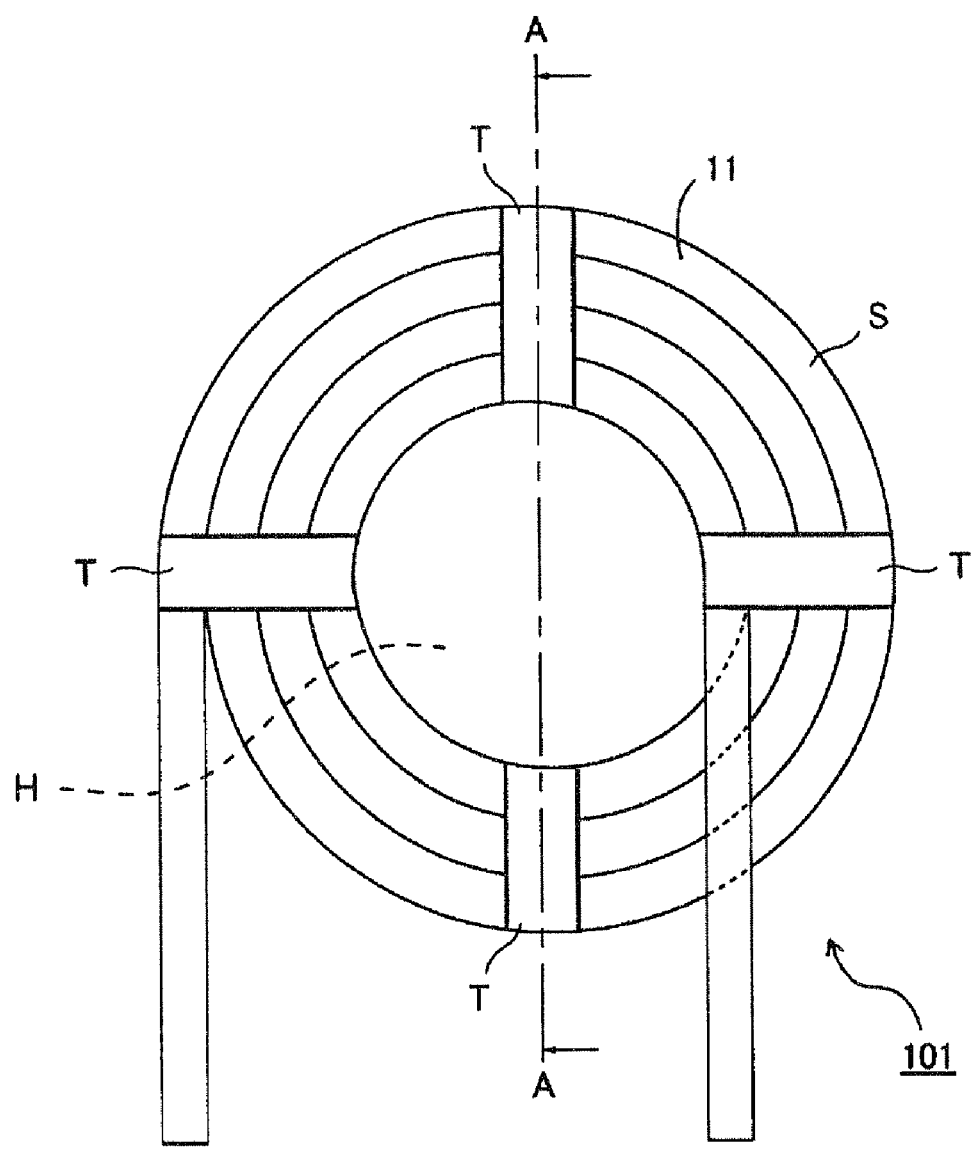
FIG. 1 is a front view showing Embodiment 1 of the optical fiber coil of the present invention.
Figure 2:
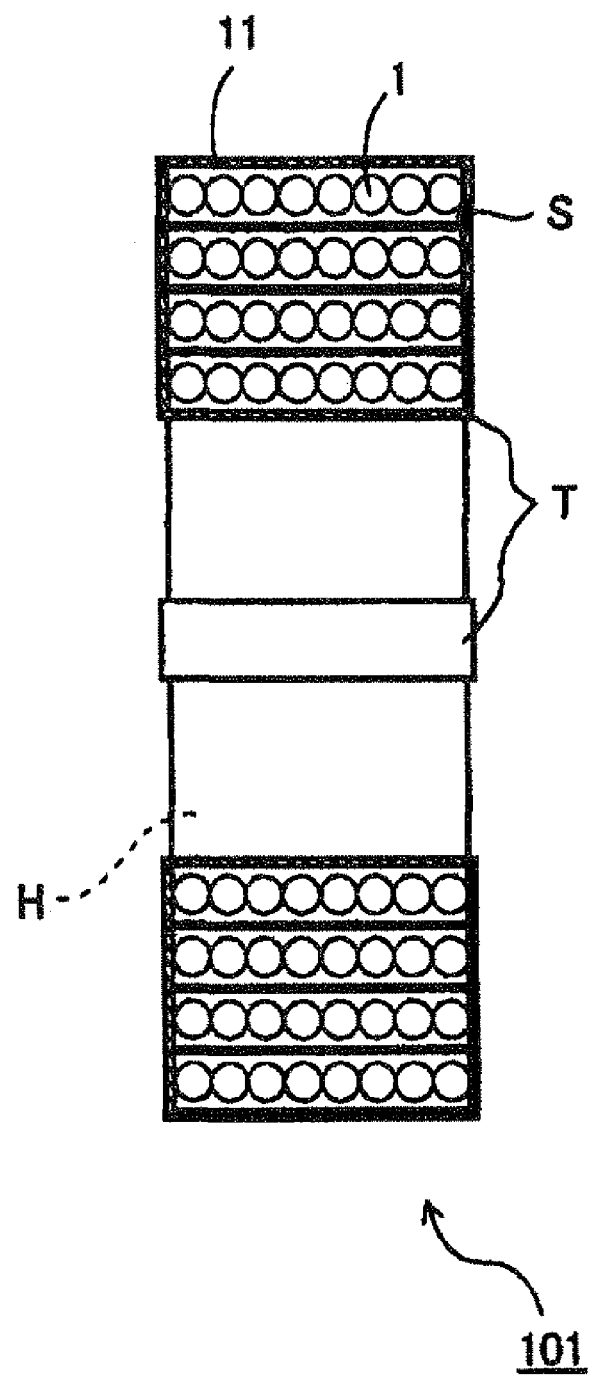
FIG. 2 is a sectional view taken along line A-A of FIG. 1.

FIG. 1 is a front view showing Embodiment 1 of the optical fiber coil of the present invention, and FIG. 2 is a sectional view taken along line A-A of FIG. 1.

Reference numeral 1 indicates a single optical fiber, reference numeral 11 indicates an optical fiber ribbon having eight single optical fibers, reference numeral 101 indicates an optical fiber coil of Embodiment 1, reference letter H indicates a central hole, reference letter S indicates a covering portion, and reference letter T indicates a band for maintaining a coiled shape.

As shown in FIGS. 1 and 2, the optical fiber coil 101 of Embodiment 1 does not have a conventional structure in which a single optical fiber 1 is simply wound in a coiled state; it is instead formed by previously arranging eight single optical fibers 1 in parallel and integrally covering them with a covering portion S so as to form an optical fiber ribbon 11, and by winding the optical fiber ribbon 11 in a coiled state. In addition, the optical fiber ribbon 11 is fixed by a band T, when necessary, so that a coiled form is maintained. Here, threads, wires, or the like, may be used instead of the band T.

According to such a structure, the single optical fiber 1 is not exposed by the coating portion S, and the optical transmission loss due to stress or temperature change can be decreased. Winding time can be minimized by winding the bundled optical fiber ribbon 11 in a coiled state instead of winding each single optical fiber 1 separately. In addition, if the coiled form is maintained by the weight of the optical fiber ribbon 11 itself, the adhesive can be omitted. Furthermore, the adhesive can be applied only between the parts of the optical fiber ribbons 11 because each single optical fiber 1 is already integrated, and as a result, the application amount of the adhesive and the process for applying the adhesive can be decreased. Therefore, the optical fiber coil can be simply produced, and time and costs can be lower than in conventional techniques.

In addition, at both ends of the optical fiber ribbon, each single optical fiber 1 can be used by tearing up the coated portion, and it can be wired in various circuits without limitation.

The covering portion S may cover both sides of the single optical fiber 1, or it may cover only one side thereof. It is preferable that both sides of the single optical fiber 1 be covered as shown in FIG. 2 because it is thereby difficult for optical transmission loss due to stress or temperature changes to occur.

It is preferable that the thickness of the covering portion be 500 μm or less. It is more preferable that thickness of the covering portion be 250 μM or less. When the thickness exceeds 500 mm, flexibility is insufficient.

As a material of the coating portion S, various adhesives may be used in which thermoplastic adhesive, thermosetting adhesive, room temperature setting adhesive, ultraviolet radiation curable adhesive, electron beam curable adhesive, etc., are added to urethane resin, acrylic resin, epoxy resin, nylon resin, phenol resin, polyimide resin, vinyl resin, silicone resin, rubber resin, fluoroepoxy resin, fluoroacrylic resin, etc. For the above material of the covering portion S, an acrylic resin that is easy to handle and a silicone resin having flexibility are preferable, and silicone rubber is more preferable.

In the silicone rubber, it is preferable that the hardness described below be 20 to 90 and that the tensile strength be 15 to 80 $kgf/cm^2$. It is more preferable that the hardness be 25 to 75 and that the tensile strength be 15 to 60 $kgf/cm^2$, and it is most preferable that the hardness be 30 to 65 and that the tensile strength be 15 to 50 $kgf/cm^2$.

In the case in which the hardness of the silicone rubber is less than 20 and the tensile strength is less than 15 $kgf/cm^2$, strength against side pressure, twisting, or the like, of the produced optical fiber ribbon 1 is insufficient, and the optical fiber ribbon 1 is easily ruptured by slight deformation during working.

In addition, in the case in which the hardness of the silicone rubber exceeds 90 and the tensile strength exceeds 80 $kgf/cm^2$, the flexibility is not sufficient, and it is difficult to wind the fiber ribbon in a coiled state.

Here, the "hardness" means "durometer hardness" as measured according to a method provided by Japanese Industrial Standard K6249. That is, a test piece of silicone rubber having a thickness of 6 mm is produced, a pressing needle of a type A durometer is perpendicularly pressed at the surface of the test piece without impact, and durometer hardness is measured by reading a scale thereof. The durometer is a tester in which hardness is measured by pressed depth of the pressing needle which is pressed using a spring.

In addition, as the adhesive, any adhesives having adhesive strength in which a coiled form of a wound optical fiber ribbon 11 can be maintained against tension generated by winding of the ribbon, can be used. For example, various adhesives can be used in which thermoplastic adhesive, thermosetting adhesive, room temperature setting adhesive, ultraviolet radiation curable adhesive, electron beam curable adhesive, etc., are added to urethane resin, acrylic resin, epoxy resin, nylon resin, phenol resin, polyimide resin, vinyl resin, silicone resin, rubber resin, fluoroepoxy resin, fluoroacrylic resin, etc.

Next, Embodiment 2 of the present invention will be explained with reference to FIG. 3.

Figure 3:
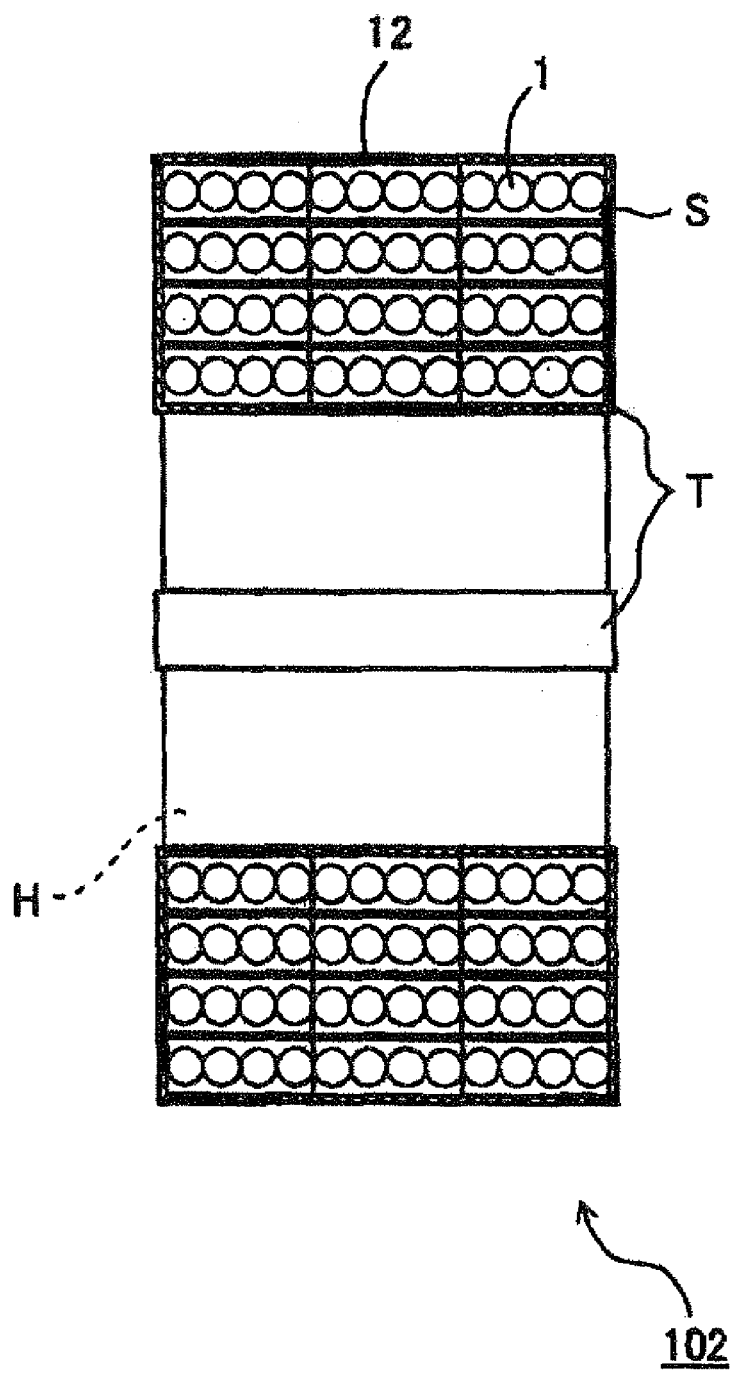
FIG. 3 is a sectional view showing Embodiment 2 of the optical fiber coil of the present invention.

FIG. 3 is a sectional view showing Embodiment 2 of the optical fiber coil of the present invention. Here, a front view is omitted, since it is the same as that in FIG. 1.

Reference numeral 12 indicates an optical fiber ribbon having four single optical fibers, and reference numeral 102 indicates an optical fiber coil of Embodiment 2.

The optical fiber coil 102 of Embodiment 2 is different from the optical fiber coil 101 of Embodiment 1, and it has a structure in which plural lines of the single optical fiber are wound in a coiled state.

That is, as shown in FIG. 3, the optical fiber coil 102 of Embodiment 2 is formed by previously arranging four single optical fibers 1 in parallel and integrally covering them with a covering portion S so as to form an optical fiber ribbon 12, and by winding 3 lines of the optical fiber ribbons 12 in a coiled state.

Thus, in the optical fiber coil of the present invention, plural lines of the single optical fibers can also be wound in a coiled state.

Next, Embodiment 3 of the present invention will be explained with reference to FIGS. 4 and 5.

Figure 4:
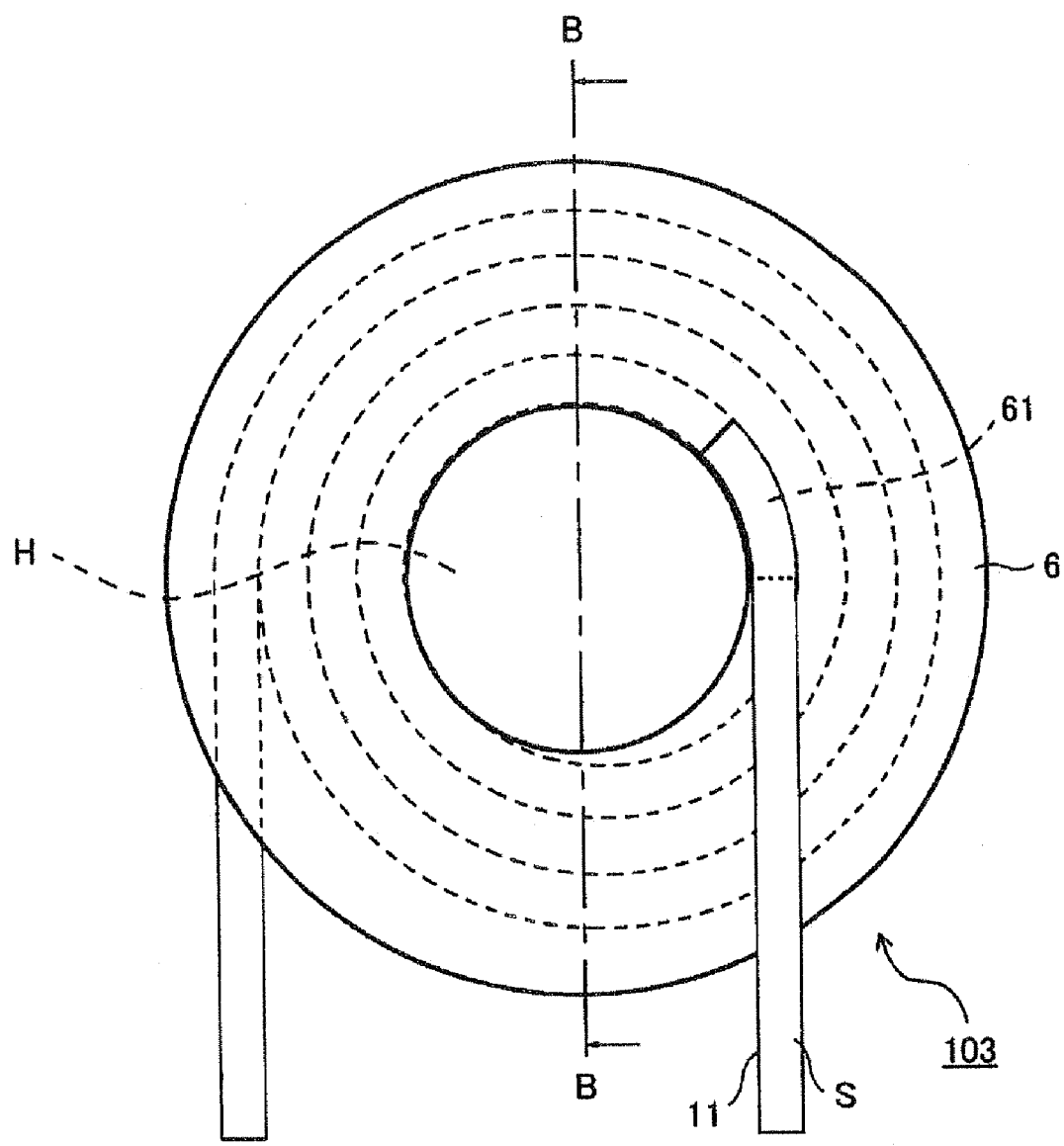
FIG. 4 is a front view showing Embodiment 3 of the optical fiber coil of the present invention.
Figure 5:
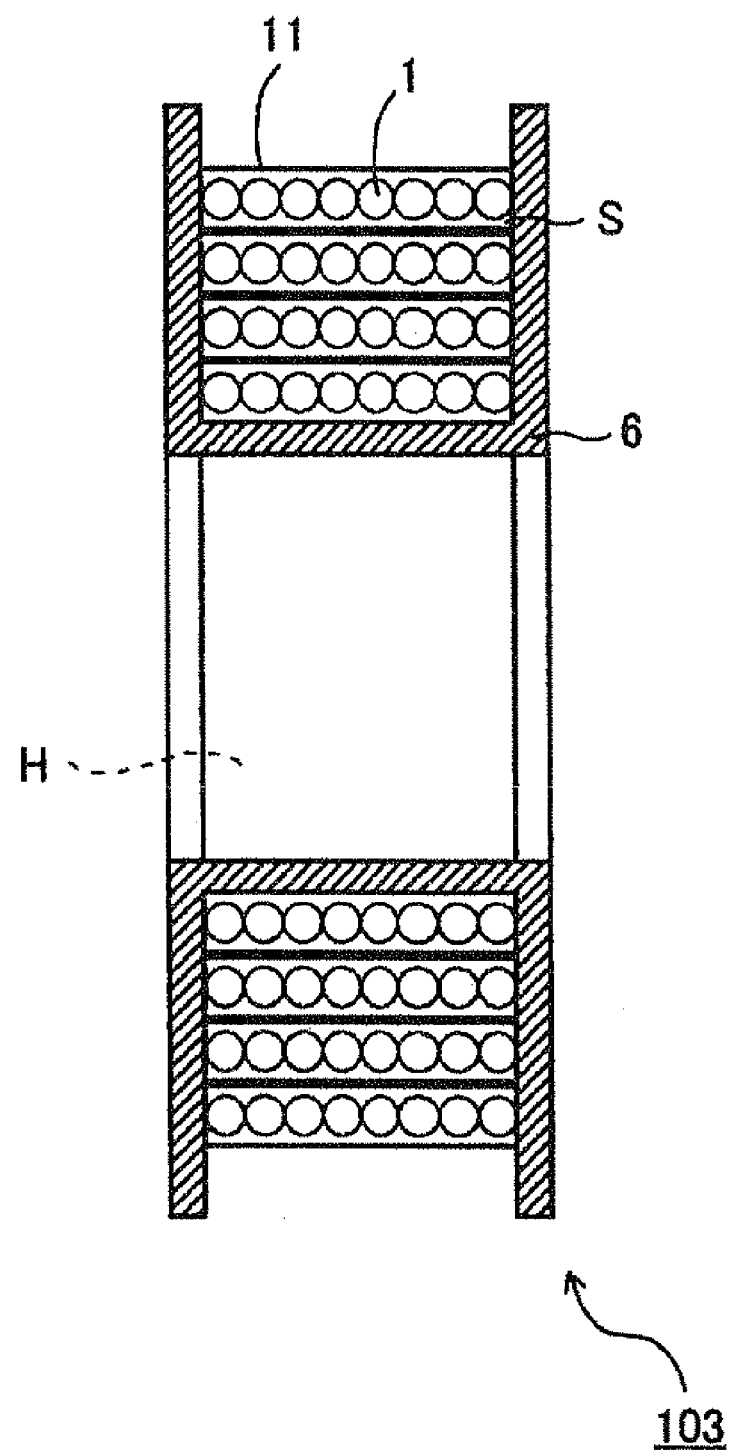
FIG. 5 is a sectional view taken along line B-B of FIG. 4.

FIG. 4 is a front view showing Embodiment 3 of the optical fiber coil of the present invention, and FIG. 5 is a sectional view taken along line B-B of FIG. 4.

Reference numeral 6 indicates a bobbin, reference numeral 61 indicates a dispensing hole in a strip shape, and reference numeral 103 indicates an optical fiber coil of Embodiment 3.

As shown in FIG. 4, the optical fiber coil 103 of Embodiment 3 has a structure in which the optical fiber ribbon 11 is wound on the bobbin 6 in a coiled state.

Thus, the optical fiber coil of the present invention can also be wound on the bobbin in a coiled state.

As a bobbin 6 used in winding in a coiled state, bobbins made of metals such as iron, aluminum, etc., plastics, glass, or the like, can be used. Bobbins made of metal, glass, plastic mixed with glass fiber or filler, etc., are preferable, since dimensional changes due to temperature changes or humidity changes are small. In addition, the size of the bobbin 6 is not limited, and the size can be selected depending on flexibility of the optical fiber or the installation space of the bobbin.

As a bobbin 6, any of a bobbin without a flange, a bobbin with a flange on one side, and a bobbin with flanges on both sides, may be used. However, the bobbin with flanges on both sides, as shown in FIG. 5, is preferable since the coil shape is maintained.

In the bobbin 6, a dispensing hole 61 may be provided as necessary, and thereby a tip of the optical fiber ribbon 11 can be taken out. The dispensing hole 61 may be formed in a preferable shape which can easily allow the taking out of the optical fiber ribbon 11, such as a strip shape, an elliptical shape, or the like.

Next, Embodiment 4 of the present invention will be explained with reference to FIGS. 6 and 7.

Figure 6:
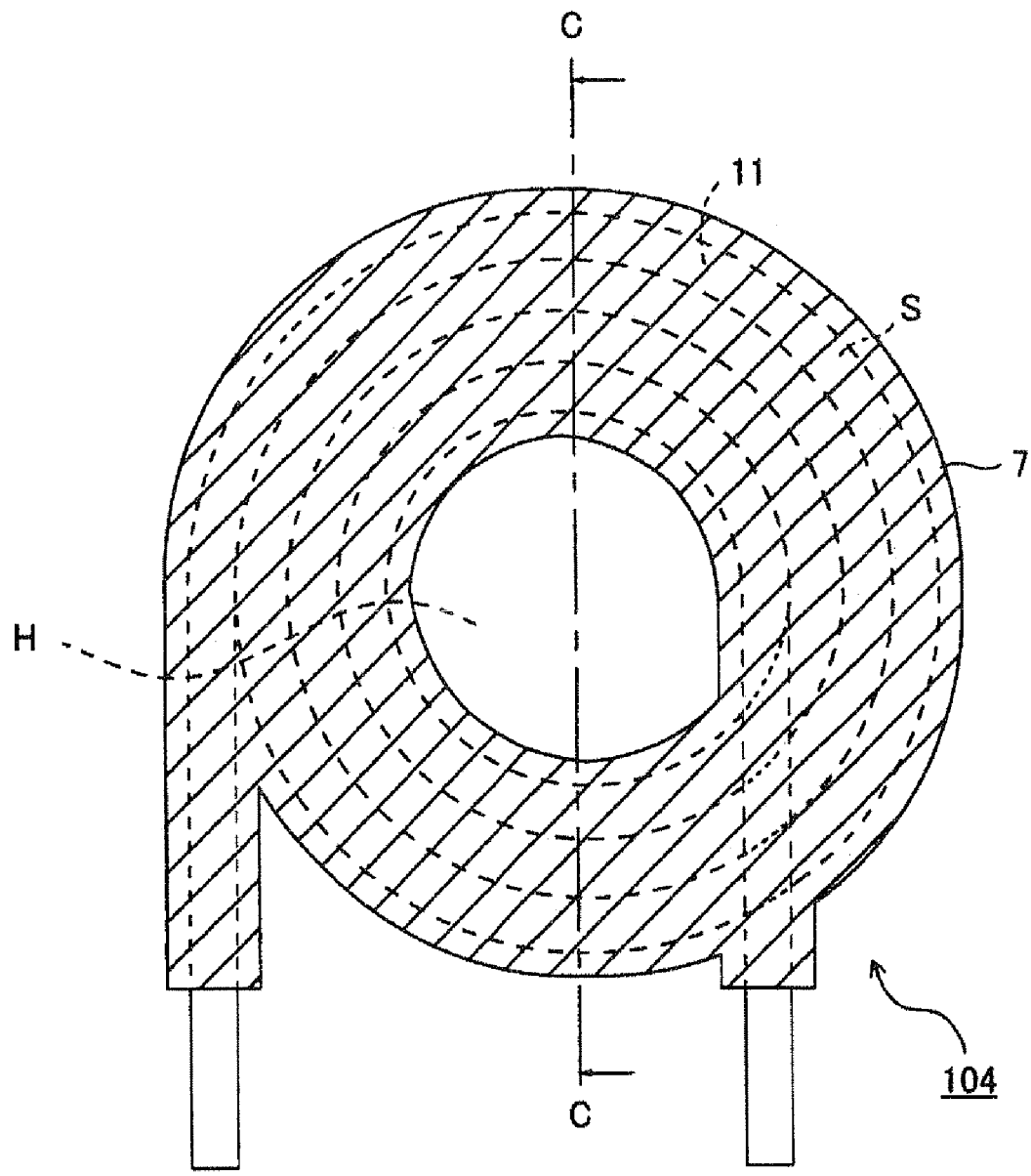
FIG. 6 is a front view showing Embodiment 4 of the optical fiber coil of the present invention.
Figure 7:
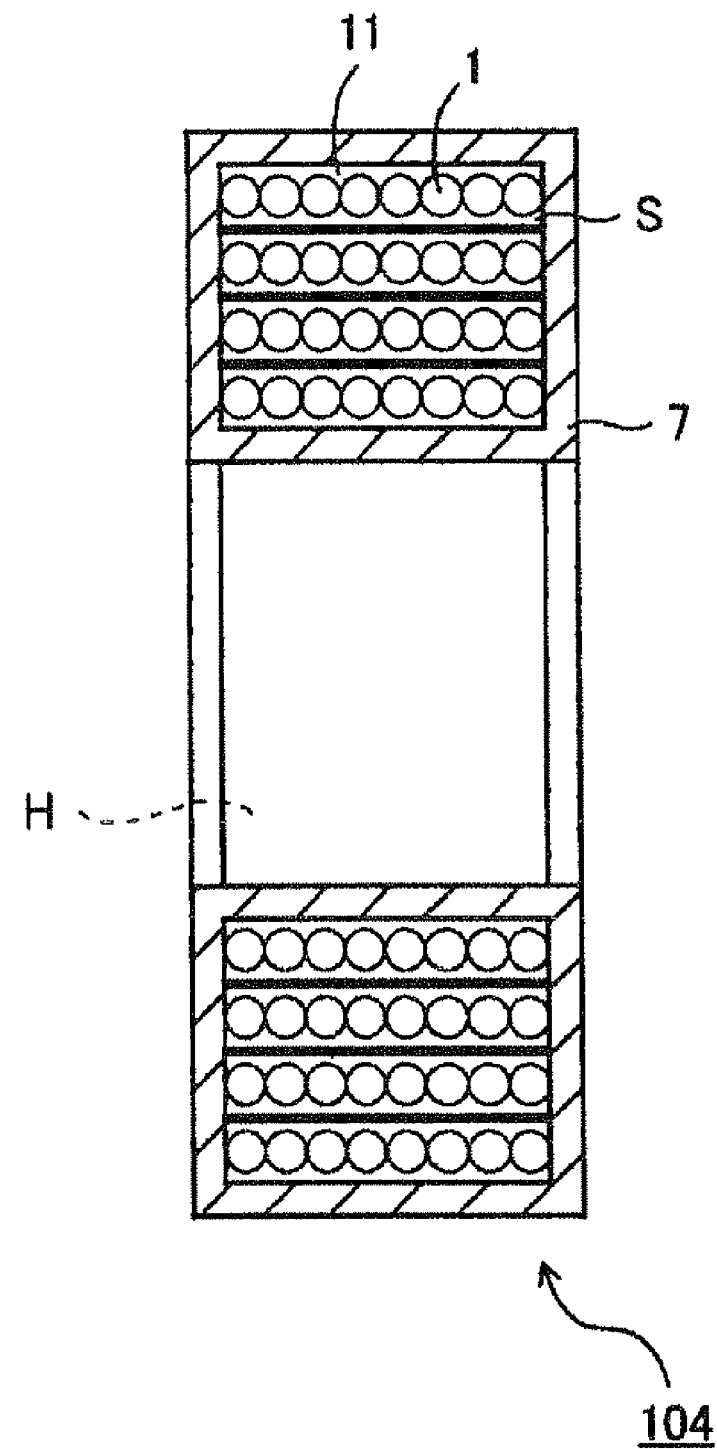
FIG. 7 is a sectional view taken along line C-C of FIG. 6.
Figure 8:
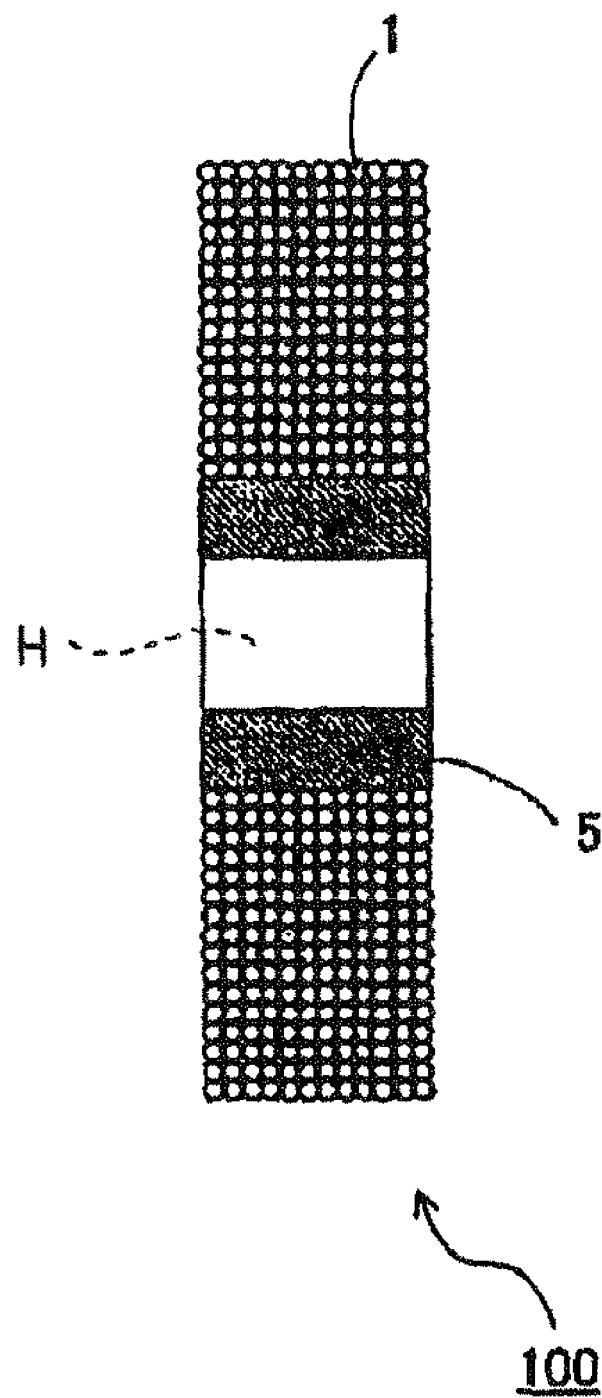
FIG. 8 is a front view showing an embodiment of the conventional optical fiber coil.

FIG. 6 is a front view showing Embodiment 4 of the optical fiber coil of the present invention, and FIG. 7 is a sectional view taken along line C-C of FIG. 6.

Reference numeral 7 indicates a coating portion made of silicone rubber, naphtha rubber, etc., and reference numeral 104 indicates an optical fiber coil of Embodiment 4.

As shown in FIG. 6, in the optical fiber coil 104 of Embodiment 4, a portion other than the end portions of the optical fiber ribbon 11 is coated by the coating portion 7.

By coating the coating portion 7, the coil shape is fixed and the optical transmission loss can be decreased. In addition, at near both ends of the optical fiber ribbon 11, each single optical fiber 1 can be used by tearing up the coated portion, and it can be wired into various circuits without limitation.

In the coating portion 7, well-known resins such as natural rubbers, naphtha rubber, butadiene rubber, or the like, can also be used, and in particular, it is preferably rubber material having superior weatherability and high flexibility which is difficult to apply stress to the optical fiber ribbon 11. For example, silicone rubber, chloroprene rubber, butyl rubber, hydrogenated nitrile rubber, can be used. In addition, it is more preferable that platinum containing rubber or rubber which contains titanium oxide, iron oxide, carbon, metal carbonate, etc., as a flame resistant agent, such as flame resistant silicone rubber or chloroprene rubber be used in the coating portion 7, since the optical fiber coil would be flame resistant.

Next, a production method for the optical fiber coil of the present invention will be explained.

The production method for the optical fiber coil of the present invention includes arranging in parallel plural single optical fibers and integrally covering them with covering portion S, so as to form an optical fiber ribbon, and winding the optical fiber ribbon in a coiled state.

First, the optical fiber ribbon is formed by arranging in parallel plural single optical fibers and by integrally covering them with the covering portion S.

The covering method is not limited to specific methods, and in the present invention, a method in which covering material is applied to plural single optical fibers arranged in a plane, and this is molded using a molding jig, as in, for example, a method disclosed in Japanese Unexamined Patent Application Publication No. 2004-240152, or the like, can be preferably used.

The covering portion S may be provided at both sides of the single optical fiber 1, or it may be provided at only one side thereof. It is preferable that it be provided at both sides of the single optical fiber, since it would be difficult for optical transmission loss due to stress or temperature changes to occur.

The optical fiber coil of the present invention is then produced by winding the optical fiber ribbon in a coiled state.

In winding in a coiled state, it is not essential that the bobbin be used. However, it is preferable that the bobbin be used, since the shape is easily maintained.

When the optical fiber ribbon 11 is wound in a coiled state, a method in which adjacent optical fiber ribbons 11 are fixed by applying adhesive, may be used.

Furthermore, a portion other than the ends of the optical fiber ribbon may be immersed in liquid rubber, resin, etc., and be pulled out, dried, and cured, and thereby, the coating portion 7 that covers the optical fiber coil is formed.

It is not essential that the coating portion 7 be formed. However, it is preferable that the coating portion 7 be formed, since resistance to stress is extremely superior.

As described above, according to the production method for the optical fiber coil of the present invention, in comparison with conventional methods in which a single optical fiber 1 is wound onto a bobbin or the like using adhesive, winding time can be minimized, and the adhesive can be also be minimized or omitted, so that the process for applying the adhesive is minimized. Therefore, the optical fiber coil can be produced simply, and time and costs can be lower than in conventional techniques.

EXAMPLES

Example 1

As single optical fiber 1, eight single optical fiber cables having a length of 50 meters (quartz single-mode optical fiber, outer diameter 0.25 mm, produced by Furukawa Electric Co., Ltd.) were used.

Room-temperature-setting silicone rubber (trade name: TSE392, hardness of 26, tensile strength of 16 kgf/cm$^2$, produced by GE Toshiba Silicones, Ltd.) before curing, which was the material of covering portion S, was applied to the surface of a flat base. The eight single optical fiber cables 1 were arranged on the applied silicone rubber in parallel, and room-temperature-setting silicone rubber was further applied on the single optical fiber cables 1. Then, the applied material was molded using a molding jig and was cured by drying, and thereby an optical fiber ribbon 11 was produced. The thickness of the covering portion S was 10 µm.

Next, the optical fiber ribbon 11 was wound in a coiled state by a winding machine.

The winding machine contains a cylindrical core that rotates at a constant speed and two disklike flanges that can be engaged with the core and be fixed. The outer diameter of the core was 30 mm, the outer diameter of the flange was 60 mm, and the spacing between the two flanges was 12 mm.

The optical fiber ribbon 11 was fixed to the core at a position 1 m away from the end and was wound in a coiled state by rotating the core, while it was turned up every five lines so as to not be biased, and therefore, an optical fiber coil of Example 1 was produced. Then, the optical fiber ribbon 11 was fixed at eight points at even intervals by wires before it was pulled out from the core by removing the flanges.

As described above, the optical fiber coil of Example 1 was produced.

Example 2

With respect to the optical fiber coil of Example 1, a coating portion in which the optical fiber coil was covered at a portion other than at both ends of the optical fiber ribbon 11 was formed.

Specifically, the produced optical fiber coil of Example 1 was dipped into silicone rubber (trade name: TSE3250, produced by GE Toshiba Silicones, Ltd.) other than both ends of the optical fiber ribbon 11, was pulled up, and was dried and cured at 100° C. for 2 hours, and thereby the coating portion 7 was formed.

As described above, the optical fiber coil of Example 2 was produced.

Comparative Example 1

One single optical fiber 1 (quartz single-mode optical fiber, outer diameter 0.25 mm, produced by Furukawa Electric Co., Ltd.) was wound in a coiled state, and an optical fiber coil of Comparative Example 1 was produced.

Specifically, first an adhesive layer was formed by applying an adhesive (ultraviolet curable resin, trade name: Viscotack PM-654, produced by Osaka Organic Chemical Industry Ltd.) to the entire surface of the single optical fiber 1.

Next, the single optical fiber 1 having the adhesive layer was wound in a coiled state by the above winding machine.

In this case, the single optical fiber 1 was clamped by two rubber sheets and was wound in a coiled state while stress was applied so that there was no slack.

Then, the adhesive layer was cured by a UV irradiation application at an irradiation strength of 20 mW/cm$^2$ for an irradiation time of 10 seconds, and the optical fiber coil of the Comparative Example 1 was thereby produced.

Evaluation Methods

The optical fiber coils of the Examples and Comparative Example were evaluated by the following methods.

Insertion Loss

Insertion loss of each optical fiber coil was measured by a light multi-power meter. With respect to the optical fiber coils of the Examples 1 and 2, measured values of the eight single optical fibers were averaged.

Temperature Cycling Evaluation

With respect to each optical fiber coil, 10 cycles of temperature cycling tests in a range of −40 to 75° C. were carried out, and a maximum value of the insertion loss was measured.

Production Time of Optical Fiber Coil

Production time of each optical fiber coil was measured. This time includes the working time for arranging and adjusting the single optical fibers 1; however, it does not include the curing time for the coating portion 7, which does not require human labor.

The evaluation results are shown in Table 1.

TABLE 1

| | Insertion Loss (dB) | Temperature Cycling Evaluation (dB) | Production Time of Optical Fiber Coil (min) |
|---|---|---|---|
| Example 1 | 0.03 | 0.03 | 28 |
| Example 2 | 0.02 | 0.02 | 32 |
| Comparative Example 1 | 0.1 | 0.15 | 30 |

Evaluation Results

The optical fiber coils of the Examples 1 and 2 did not have problems in practical use, since the insertion losses were 0.03 or less. In our opinion, this was because the optical fiber coil of the present invention had a structure in which plural single optical fibers were previously arranged in parallel and were integrally covered by a covering portion, so that stress was dispersed.

In contrast, the Comparative Example 1 had a slight problem in practical use, since the insertion loss was 0.1. In our opinion, this was because the optical fiber coil of the Comparative Example 1 was made of the single optical fiber, and stress was therefore easily concentrated at a local portion. In addition, in measurement of the insertion loss of the optical fiber coil of the Comparative Example 1, measured values were uneven.

With respect to the temperature cycle evaluation, the optical fiber coils of the Examples 1 and 2 having the coating portion did not have problems in practical use, since there was hardly any change in loss, and maximum values were 0.03 or less.

However, the Comparative Example 1 had a problem in practical use, since the insertion loss was changed by stress concentration due to temperature changes, and the maximum value was 0.15.

With respect to the production time of the optical fiber coil, in the optical fiber coil of the Examples 1 and 2, although a process for producing the optical fiber ribbon was increased, working time was the same as that of the Comparative Example 1, since in processes after the adhesive application the single optical fibers were easily clamped by forming the ribbon, and it was not necessary to precisely control the stress in winding in a coiled state.

In contrast, the Comparative Example 1 required a lot of time for arranging single optical fibers, application of adhesive, control of stress, and repeating processes in some cases.

What is claimed is:

1. A production method for an optical fiber coil, comprising:
   arranging in parallel plural single optical fibers;
   integrally covering the single optical fibers with a covering portion to form an optical fiber ribbon;
   winding the optical fiber ribbon into a coiled state to form an optical fiber coil; and
   fixing the optical fiber ribbon into a coil shape by forming a coating portion that covers the optical fiber coil at a portion other than at ends of the ribbon,
   wherein the step for forming a coating portion includes a step for immersing the optical fiber coil in liquid material.

2. The production method for an optical fiber coil according to claim 1, wherein the step for forming a coating portion further includes steps for pulling out, drying, and curing the optical fiber coil.

* * * * *